(12) United States Patent
Lin et al.

(10) Patent No.: US 11,937,649 B2
(45) Date of Patent: Mar. 26, 2024

(54) CONSTANT-POWER ELECTRONIC CIGARETTE PROTECTING AGAINST DRY-HEATING AND CONTROLLING METHOD THEREOF

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 534 days.

(21) Appl. No.: 17/311,998

(22) PCT Filed: Oct. 24, 2019

(86) PCT No.: PCT/CN2019/112894
§ 371 (c)(1),
(2) Date: Jun. 8, 2021

(87) PCT Pub. No.: WO2020/134428
PCT Pub. Date: Jul. 2, 2020

(65) Prior Publication Data
US 2022/0007740 A1    Jan. 13, 2022

(30) Foreign Application Priority Data
Dec. 29, 2018 (CN) .......................... 201811638426.4

(51) Int. Cl.
*A24F 40/57* (2020.01)
*A24F 40/10* (2020.01)
(Continued)

(52) U.S. Cl.
CPC .............. *A24F 40/57* (2020.01); *A24F 40/10* (2020.01); *A24F 40/46* (2020.01); *A24F 40/53* (2020.01);
(Continued)

(58) Field of Classification Search
CPC ................ Y02E 60/10; G05D 23/1919; G05D 23/2401; A24F 40/57; A24F 40/10;
(Continued)

(56) References Cited

U.S. PATENT DOCUMENTS

2018/0242634 A1* 8/2018 Sur .......................... A24F 40/00

FOREIGN PATENT DOCUMENTS

CN          104349687 A  *  2/2015  ............. A24F 15/01
CN          104720119 A     6/2015
(Continued)

OTHER PUBLICATIONS

International Search Report of PCT Patent Application No. PCT/CN2019/112894 dated Jan. 9, 2020.

*Primary Examiner* — Jean F Duverne

(57) ABSTRACT

A constant-power electronic cigarette protecting against dry-heating and a controlling method thereof are provided. The electronic cigarette comprises a vaporization rod (1) with a heating resistor arranged therein and comprises a battery rod (2) in which a battery (4), a control circuit board (5) and an unlock switch button (6) and a starting switch are arranged. The heating resistor is a variable resistor with a resistance variable depending on a change in temperature and having a positive temperature coefficient. The control circuit board (5) is arranged with a microcontroller chip, a resistance detection unit, a constant-power output control unit, an output feedback unit, wherein the unlock switch button and the starting switch are electrically connected with the microcontroller chip.

8 Claims, 7 Drawing Sheets

(51) Int. Cl.
*A24F 40/46* (2020.01)
*A24F 40/53* (2020.01)
*A24F 40/60* (2020.01)
*G05D 23/24* (2006.01)
*H01M 10/42* (2006.01)
*H01M 10/46* (2006.01)
*H01M 10/48* (2006.01)
*H02J 7/00* (2006.01)
*H05B 1/02* (2006.01)

(52) U.S. Cl.
CPC ......... *A24F 40/60* (2020.01); *G05D 23/2401* (2013.01); *H01M 10/425* (2013.01); *H01M 10/46* (2013.01); *H01M 10/48* (2013.01); *H02J 7/0063* (2013.01); *H05B 1/0244* (2013.01); *H01M 2010/4271* (2013.01); *H01M 2220/30* (2013.01)

(58) Field of Classification Search
CPC .......... A24F 40/46; A24F 40/53; A24F 40/60; H01M 10/425; H01M 10/46; H01M 10/48; H01M 2010/4271; H02J 7/0063; H05B 1/0244
See application file for complete search history.

(56) References Cited

FOREIGN PATENT DOCUMENTS

| | | | |
|---|---|---|---|
| CN | 106509998 A | 3/2017 | |
| CN | 107404107 A | 11/2017 | |
| EP | 3756480 A1 * | 12/2020 | ........... A24F 47/008 |

* cited by examiner

CONSTANT-POWER ELECTRONIC CIGARETTE PROTECTING AGAINST DRY-HEATING AND CONTROLLING METHOD THEREOF

TECHNICAL FIELD

The disclosure relates to the field of electronic cigarettes, more particularly to a constant-power electronic cigarette protecting against dry-heating and a method of controlling the same.

BACKGROUND

The electronic cigarettes usually heat the e-cigarette liquid by means of a vaporizing device, to produce vapor for the smoker. As people pay more and more attention to health, they begin to realize the harmful health effects of tobacco. Since e-cigarette liquid does not contain tobacco tars, the harm of the vaporized cigarette liquid to the human body is reduced. Thus, the e-cigarettes are widely used and gradually replace tobacco cigarettes.

During use of existing electronic cigarettes, as the battery power and the electric energy are decreasing, the battery's voltage is decreasing, and thus the amount of vapor that is generated by vaporization of the cigarette liquid is decreasing. In addition, to prevent the electronic cigarette out of cigarette liquid from dry-heating at the temperature that is rapidly raised, the heating resistor, which has a resistance value variable depending on a change in temperature, is provided to detect the operating temperature of the heating resistor. However, when the operating temperature is changed and the resistance value of the heating resistor is increased, the operating voltage may be reduced and the power may be decreased, resulting in that the amount of vapor that is produced during using is decreasing and thus resulting in a poor user experience.

SUMMARY

Technical Problem

The invention aims to overcome the above deficiencies to provide a constant-power electronic cigarette protecting against dry-heating, which can monitor the temperature of the heating resistor and make it possible to protect against dry-heating, and meanwhile which can provide a constant power to allow the amount of vapor to be kept unchanged.

Technical Solutions

The disclosure provides a technical solution as follow. A constant-power electronic cigarette protecting against dry-heating comprises a vaporization rod and a battery rod, wherein a vaporizer is arranged inside the vaporization rod, and the vaporizer comprises a heating resistor for heating and vaporizing the electronic cigarette liquid. Herein, a battery, a control circuit board, and an unlock switch button are arranged inside the battery rod. A starting switch is arranged inside the vaporization rod or inside the battery rod. The heating resistor is a variable resistor which has a resistance value variable depending on a change in temperature and has a positive temperature coefficient. The control circuit board may be arranged with a microcontroller chip, a resistance detection unit, a constant-power output control unit, and an output feedback unit, wherein the unlock switch button and the starting switch may be electrically connected with the microcontroller chip, the resistance detection unit may be electrically connected with the heating resistor, to detect the resistance value of the heating resistor and feed back a resistance value signal to the microcontroller chip, the output feedback unit may be electrically connected with the heating resistor, to detect the operating voltage of the heating resistor and send a feedback to the microcontroller chip, the constant-power output control unit may be electrically connected with the microcontroller chip, to receive a PWM control signal from the microcontroller chip, the constant-power output control unit may be configured to generate a PWM voltage at a corresponding value based on the PWM control signal and output it to the heating resistor, to allow the PWM voltage value of the heating resistor to change synchronously with the resistance value of the heating resistor, so as to provide a constant power. In this way, the amount of vapor that is generated during heating and vaporization of the electronic cigarette liquid by means of the heating resistor may remain the same. Meanwhile, the resistance value signal may be compared with a preset dry-heating value by means of the microcontroller chip. When the resistance value exceeds the preset dry-heating value, the output of the constant-power output control unit may be cut off by means of the microcontroller chip, to avoid excessively high temperature of the electronic cigarette which may result in dry-heating.

Preferably, the control circuit board may be further arranged with a battery charging unit, a battery protection unit, a battery supply unit, and a battery detection unit, which are electrically connected with the battery, wherein the microcontroller chip may be electrically connected with the battery charging unit, the battery protection unit, and the battery detection unit, respectively.

Preferably, a display unit electrically connected with the microcontroller chip may be arranged on an outer surface of the vaporization rod or of the battery rod.

Preferably, the microcontroller chip may include 20 pins, wherein a first pin may be connected with a resistance detection signal output terminal of the resistance detection unit, a third pin may be connected with a ground terminal, a fifth pin may be connected with a battery supply terminal, an eighth pin may be connected with a control signal terminal of the resistance detection unit, a thirteenth pin may be connected with a PWM control signal input terminal of the constant-power control unit, a fifteenth pin may be electrically connected with an unlock switch button signal terminal, a seventeenth pin may be connected with an auxiliary resistance detection signal terminal of the resistance detection unit, a nineteenth pin may be connected with a reference voltage terminal, and a twentieth pin may be connected with a starting switch signal terminal.

Preferably, the constant-power output control unit and the resistance detection unit may be connected with each other, and the resistance detection unit may comprise a first MOSFET having 8 pins, wherein a third pin of the first MOSFET may serve as a gate, a fourth pin and a fifth pin may be connected with each other and serve as a source, a first pin, a second pin, a sixth pin, a seventh pin, and an eighth pin may be connected with each other and serve as a drain, the third pin of the first MOSFET may serve as a control signal input terminal, the source of the first MOSFET may be connected with the third pin by a resistor R1. The resistance detection unit may further comprise resistors $R_5$, $R_3$, $R_{11}$, $R_{24}$ and capacitors $C_1$, $C_2$. The drain of the first MOSFET may be connected in series with resistors $R_{11}$, $R_{24}$ and then may be grounded. The resistor $R_{24}$ may be connected in parallel across the capacitor $C_1$. The resistor $R_{11}$ and the resistor $R_{24}$ may be connected with each other at the resistance detection signal output terminal. Further, the drain of the first MOSFET may be connected in series with the resistors $R_5$, $R_3$ and the capacitor $C_2$ and then may be grounded. The resistor $R_3$ and the capacitor $C_2$ may be connected with each other at auxiliary resistance detection signal terminal. The constant-power output control unit may comprise a second MOSFET having 8 pins, wherein a third pin of the second MOSFET may serve as a gate, a fourth pin and a fifth pin may be connected with each other and serve as a source, a first pin, a second pin, a sixth pin, a seventh pin, and an eighth pin may serve as a drain and may be connected with each other to serve as a PWM voltage output terminal, the third pin of the second MOSFET may serve as a control signal input terminal of the constant-power control unit, the fourth and fifth pins of the second MOSFET may be connected with a positive electrode of the battery, the resistor $R_7$ may be connected in series between the third pin and the fourth and fifth pins of the second MOSFET, the fourth pin and the fifth pin of the first MOSFET may be connected with the fourth pin and the fifth pin of the second MOSFET, and the joint between the resistor $R_5$ and the resistor $R_3$ may be connected with the PWM voltage output terminal.

Preferably, one end of the unlock switch button may be grounded, and the other end may serve as an unlock switch button output signal terminal, and meanwhile a resistor $R_{21}$ may be connected in series between the signal terminal and the positive electrode of the battery.

Preferably, the starting switch may include 3 pins, wherein a first pin may serve as a starting switch output signal terminal, a second pin may serve as a ground terminal, a resistor $R_{27}$ may be connected in series between a third pin and the positive electrode of the battery, and meanwhile the third pin may be connected in series with the capacitor $C_{10}$ and then may be grounded.

The disclosure provides another technical solution as follow. A method of controlling a constant-power electronic cigarette protecting against dry-heating comprises steps as follows.

(1) Setting a preset dry-heating resistance value, a preset power value, and a preset stand-by time value;

(2) Determining, by means of the microcontroller chip, whether the electronic cigarette is in an on state or not, if no, go to the next step; if yes, go to the step (4);

(3) Unlocking the unlock switch button to perform power on operation;

(4) Determining, by means of the microcontroller chip, whether the starting switch is turned on or not, if yes, go to the next step; if no, go to the step (10);

(5) By means of the resistance detection unit, detecting the resistance value of the heating coil and sending the resistance value signal to the microcontroller chip;

(6) Controlling, by means of the microcontroller chip, the constant-power output control unit to output preset power to the heating resistor;

(7) Determining, by means of the microcontroller chip, whether the resistance value of the heating resistor is increased or not, if yes, go to the next step; if no, go to the step (4);

(8) By means of the resistance detection unit, detecting the resistance value and determining whether the resistance value is greater than the preset dry-heating value or not, if yes, stop output by the constant-power output control unit and control a red light to flash 5 times and go to the step (12); if no, go to the next step;

(9) By means of the constant-power output control unit, adjusting the PWM output voltage according to the preset power value, to maintain constant-power output;

(10) Turning off the starting switch, ending the using state, and entering a stand-by state;

(11) Determining, by means of the microcontroller chip, whether the stand-by time exceeds the preset value or not, if yes, go to the next step; if no, go back to the step (4);

(12) Entering an off state.

Advantages

The present invention provides the resistance detection unit for monitoring the increase of the resistance value of the heating resistor. With the function of the microcontroller chip, the constant-power output control unit outputs PWM voltage at a value to the heating resistor. The PWM voltage value changes synchronously with the resistance value of the heating resistor to provide a constant power, such that the amount of vapor that is generated during heating and vaporization of the cigarette liquid by means of the heating resistor may remain the same. Thus, the present invention provides an electronic cigarette protecting against dry-heating, and meanwhile make it possible to keep the amount of vapor unchanged.

DETAILED DESCRIPTION OF ILLUSTRATED EMBODIMENTS

In order to make purposes, technical solutions and advantages of the disclosure clearer, the disclosure will be further explained in detail with reference to drawings and embodiments described hereinafter. It should be understood that the specific embodiments described herein are merely used to explain the present invention and are not intended to limit the present invention.

Embodiments

Figure 1:
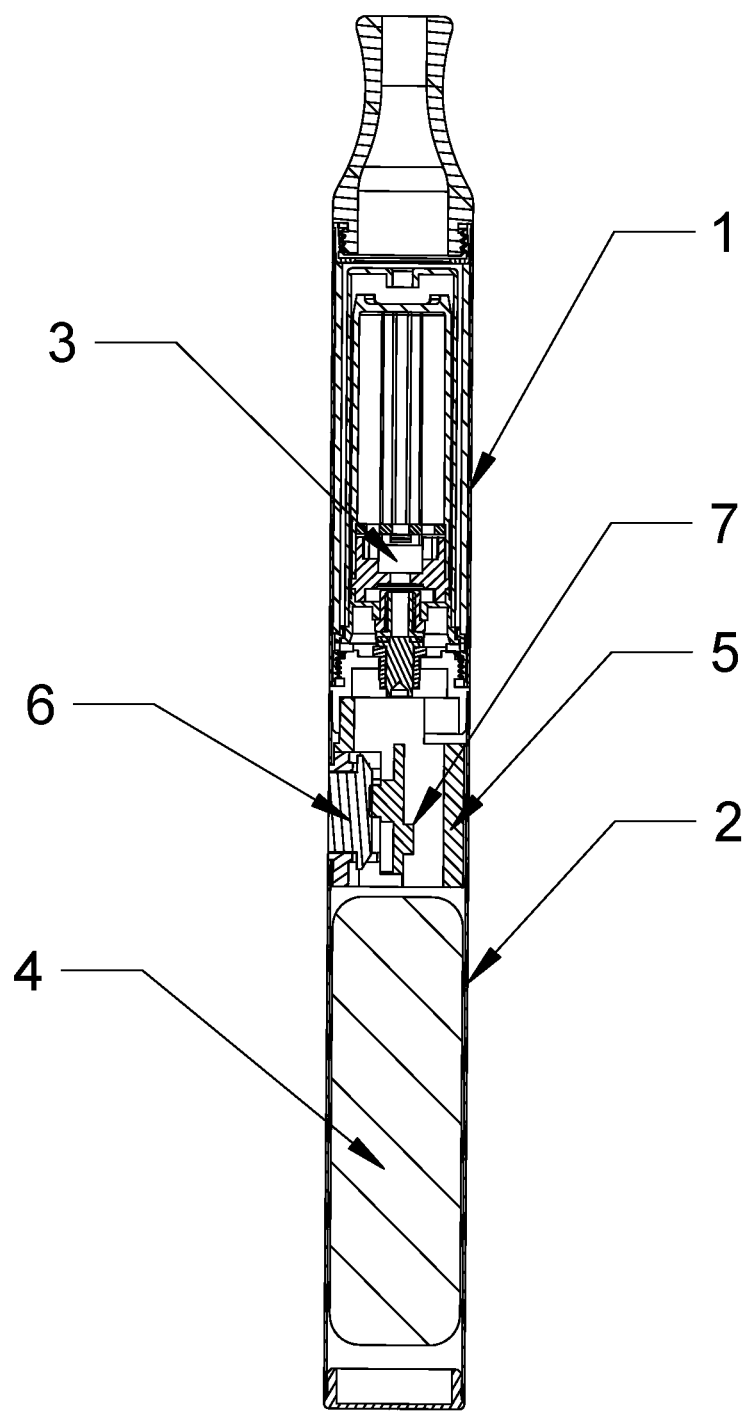
FIG. 1 is a sectional view of a constant-power electronic cigarette protecting against dry-heating of the invention.

Referring to FIG. 1, a constant-power electronic cigarette protecting against dry-heating of the disclosure comprises a vaporization rod 1 and a battery rod 2. Herein, a vaporizer 3 is arranged inside the vaporization rod 1, and the vaporizer 3 comprises a heating resistor (not shown in the drawings) for heating and vaporizing the electronic cigarette liquid. A battery 4 and a control circuit board 5 are disposed inside the battery rod 2. The heating resistor is a variable resistor, which has a resistance value variable depending on a change in temperature and has a positive temperature coefficient. An unlock switch button 6 is arranged inside the battery rod 2. During using, the user has to press the unlock switch button 6 first, to perform an unlock operation. A starting switch 7 may be arranged inside the battery rod 2 (or inside the vaporization rod 1). The starting switch 7 may be an airflow sensor switch which may be actuated by the airflow generated during using.

Figure 2:
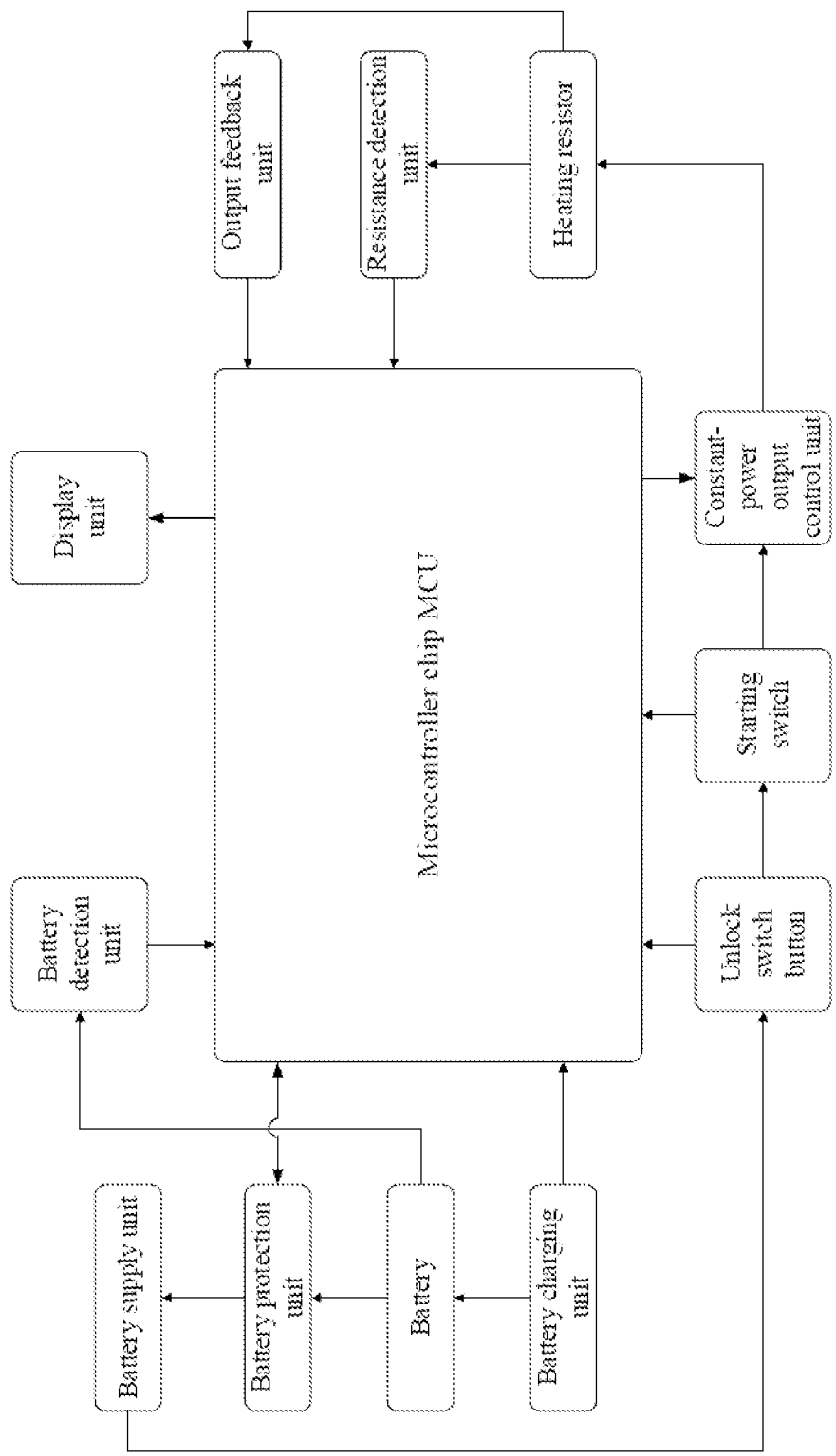
FIG. 2 is a functional structural diagram of a circuit board of the invention.
Figure 7:
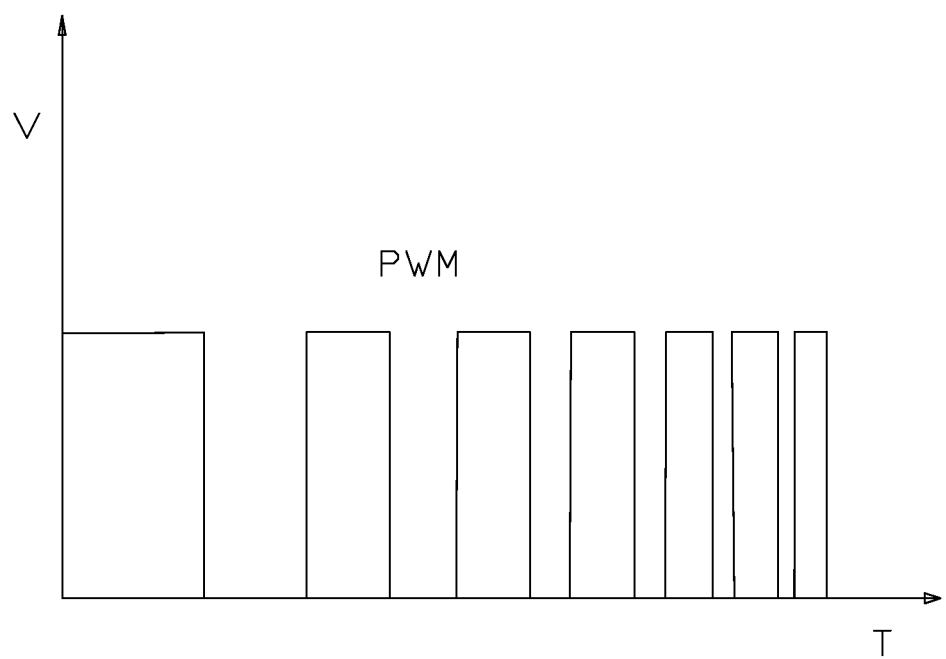
FIG. 7 is a schematic view illustrating PWM output voltage values of a constant-power output unit of the invention.

Referring to FIGS. 2 and 7, the control circuit board 5 is arranged with a plurality of components, including a microcontroller chip MCU, a resistance detection unit, a constant-power output control unit, and an output feedback unit. Herein, the unlock switch button and the starting switch are electrically connected with the microcontroller chip MCU. The resistance detection unit is electrically connected with the heating resistor, to detect the resistance value of the heating resistor and feed back a resistance value signal to the microcontroller chip. The output feedback unit is electrically connected with the heating resistor, to detect the operating voltage of the heating resistor and send a feedback to the microcontroller chip. The constant-power output control unit is electrically connected with the microcontroller chip, to receive a PWM control signal from the microcontroller chip. The constant-power output control unit is configured to generate a corresponding PWM voltage value based on the PWM control signal and output it to the heating resistor, to allow the PWM voltage value of the heating resistor to change synchronously with the resistance value of the heating resistor, so as to provide a constant power. In this way, the amount of vapor that is generated during heating and vaporization of the cigarette liquid by means of the heating resistor may remain the same. In such case, the PWM voltage, which has a duty ratio varied depending on a size of the PWM control signal, is output to the heating resistor. The greater the resistance value of the heating resistor is, the greater the average voltage value of the PWM voltage during a certain period of time is. In this way, a constant power of the heating resistor may be provided, and thus the amount of vapor that is generated during heating and vaporization of the cigarette liquid may remain the same. Meanwhile, the resistance value signal may be compared with a preset dry-heating value by means of the microcontroller chip. When the resistance value signal exceeds the preset dry-heating value, the output of the output control unit may be cut off by means of the microcontroller chip, to avoid excessively high temperature of the electronic cigarette which may result in dry-heating. FIG. 7 shows how the PWM voltage value V varies with respect to time axis T.

Referring to FIG. 2, the control circuit board 5 is arranged with a battery charging unit, a battery protection unit, a battery supply unit, and a battery detection unit, which are electrically connected with the battery. Herein, the microcontroller chip is electrically connected with the battery charging unit, the battery protection unit, and the battery detection unit, respectively.

Figure 3:
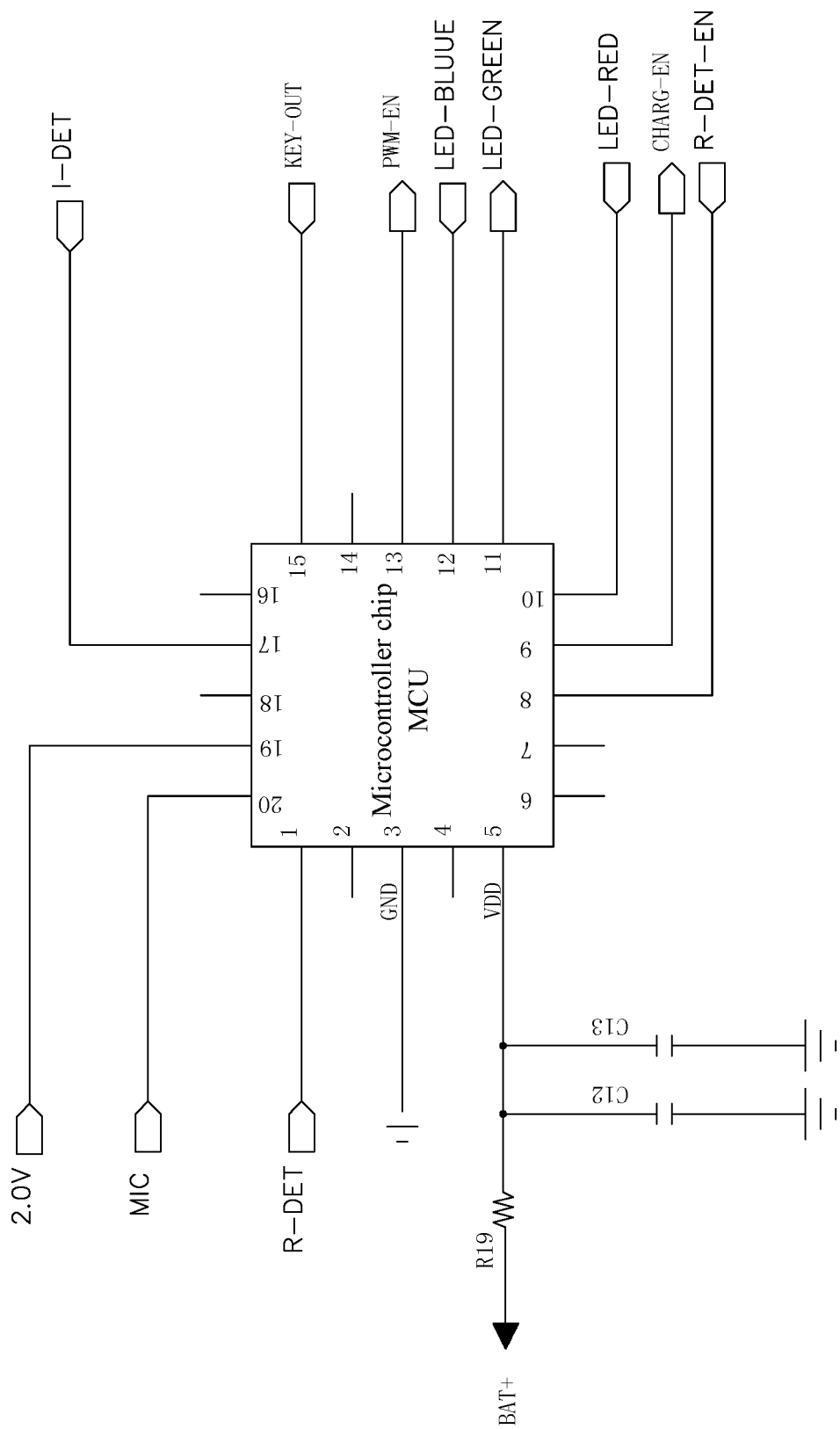
FIG. 3 is a schematic view illustrating a connection of a microcontroller chip of the invention.

Referring to FIG. 3, the microcontroller chip includes 20 pins. Herein, a first pin is connected with a resistance detection signal output terminal R-DET of the resistance detection unit, a third pin is connected with a ground terminal GND, a fifth pin is connected with a battery supply terminal VDD, an eighth pin is connected with a control signal terminal R-DET-EN of the resistance detection unit, a thirteenth pin is connected with a PWM control signal input terminal PWM-EN of the constant-power control unit, a fifteenth pin is electrically connected with a signal terminal KEY-OUT of the unlock switch button, a seventeenth pin is connected with an auxiliary resistance detection signal terminal I-DET of the resistance detection unit, a nineteenth pin is connected with a reference voltage terminal, and a twentieth pin is connected with a signal terminal of the starting switch.

Figure 4:
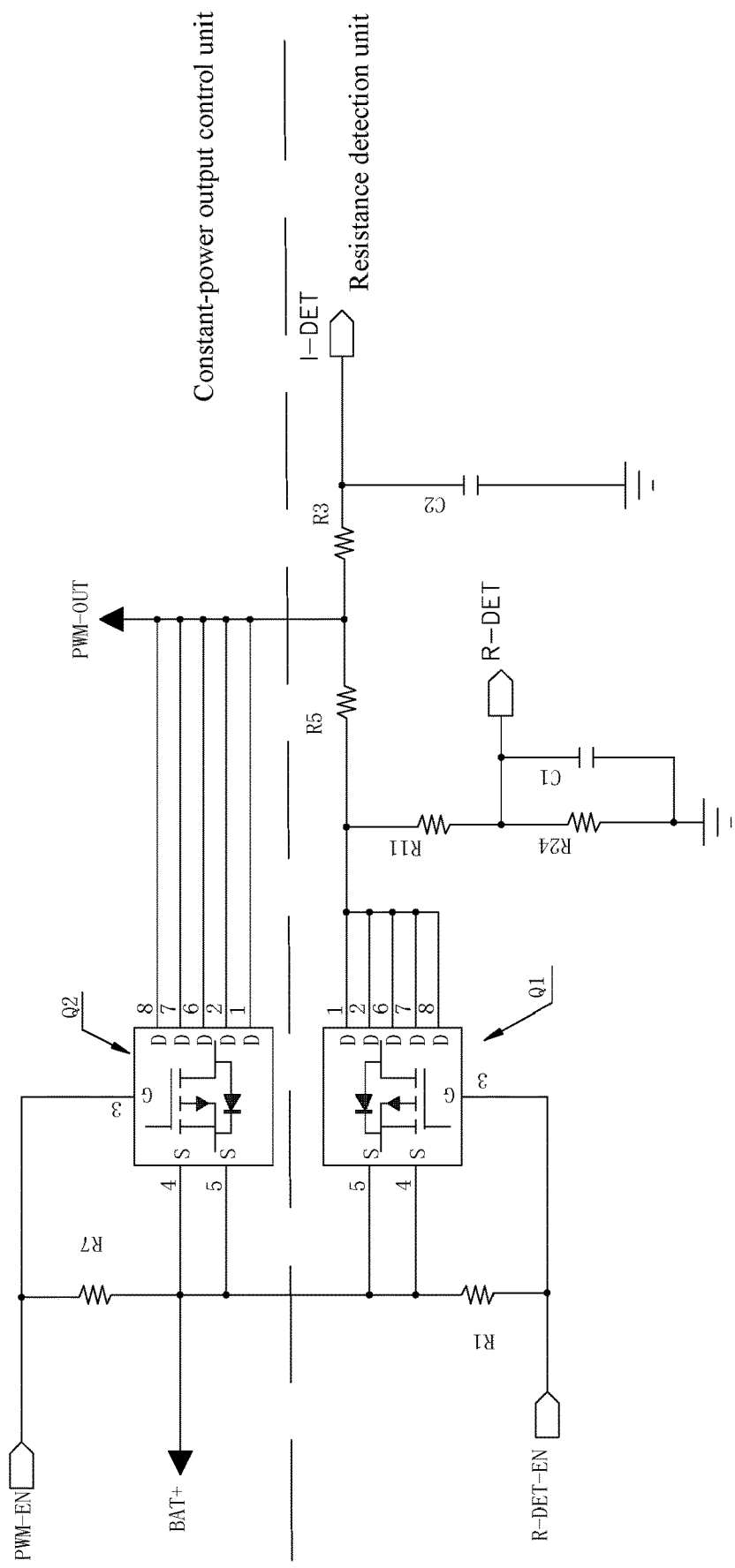
FIG. 4 is a schematic circuit diagram of a constant-power output control unit and a resistance detection unit of the invention.

Referring to FIG. 4, the constant-power output control unit and the resistance detection unit are connected with each other. The resistance detection unit comprises a first MOSFET $Q_1$ having 8 pins. Herein, a third pin of the first MOSFET $Q_1$ serves as a gate G. A fourth pin and a fifth pin are connected with each other and serve as a source S. A first pin, a second pin, a sixth pin, a seventh pin, and an eighth pin are connected with each other and serve as a drain D. The third pin of the first MOSFET serves as a control signal input terminal R-DET-EN. The source S of the first MOSFET is connected with the third pin by a resistor R1. The resistance detection unit further comprises resistors $R_5$, $R_3$, $R_{11}$, $R_{24}$ and capacitors $C_1$, $C_2$. The drain D of the first MOSFET is connected in series with resistors $R_{11}$, $R_{24}$ and then is grounded. The resistor $R_{24}$ is connected in parallel across the capacitor $C_1$. The resistor $R_{11}$ and the resistor $R_{24}$ are connected with each other at the resistance detection signal output terminal R-DET. Further, the drain D of the first MOSFET is connected in series with the resistors $R_5$, $R_3$ and the capacitor $C_2$ and then is grounded. The resistor $R_3$ and the capacitor $C_2$ are connected with each other at auxiliary resistance detection signal terminal I-DET. The constant-power output control unit comprises a second MOSFET $Q_2$ having 8 pins. Herein, a third pin of the second MOSFET $Q_2$ serves as a gate G. A fourth pin and a fifth pin which are connected with each other serve as a source S. A first pin, a second pin, a sixth pin, a seventh pin, and an eighth pin serve as a drain D and are connected with each other to serve as a PWM voltage output terminal PWM-OUT. The third pin of the second MOSFET serves as a control signal input terminal PWM-EN of the constant-power control unit. The fourth pin and the fifth pin of the second MOSFET are connected with a positive electrode of the battery. The resistor $R_7$ is connected in series between the third pin and the fourth and fifth pins of the second MOSFET. The fourth pin and the fifth pin of the first MOSFET are connected with the fourth pin and the fifth pin of the second MOSFET. The joint between the resistor $R_5$ and the resistor $R_3$ is connected with the PWM voltage output terminal PWM-OUT. As shown in FIG. 4, the portion above the dash line constitutes the constant-power output control unit, and the portion below the dash line constitutes the resistance detection unit.

Figure 5:
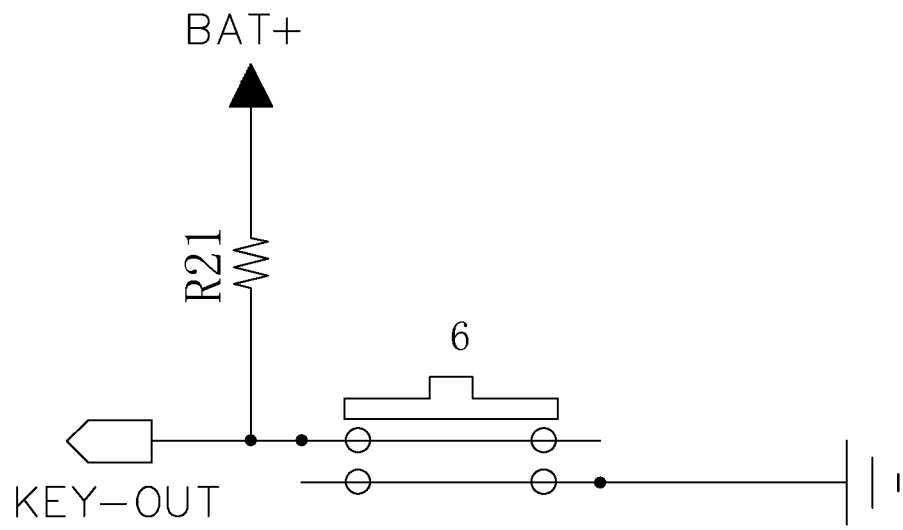
FIG. 5 is a schematic circuit diagram of an unlock switch button of the invention.

Referring to FIG. 5, one end of the unlock switch button 6 is grounded, and the other end serves as the output signal terminal KEY-OUT of the unlock switch button. Meanwhile, a resistor $R_{21}$ is connected in series between the signal terminal KEY-OUT and the positive electrode of the battery.

Figure 6:
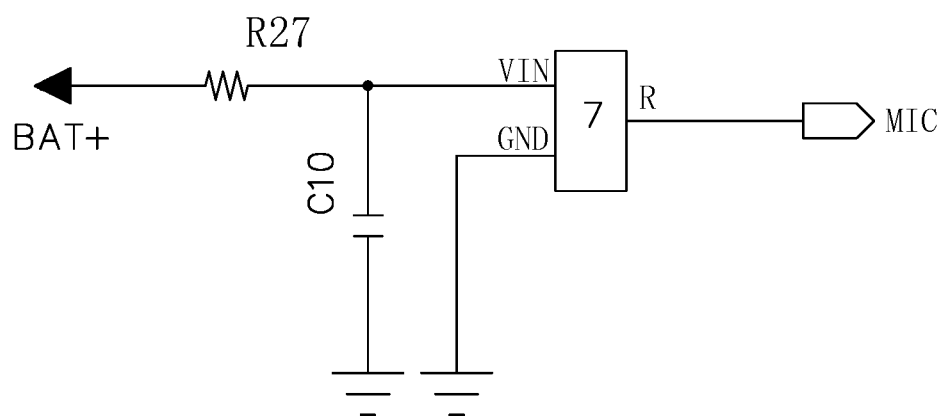
FIG. 6 is a schematic circuit diagram of a starting switch of the invention.

Referring to FIG. 6, the starting switch 7 includes 3 pins. Herein, the pin R serves as the output signal terminal MIC of the starting switch, the pin GND serves as the terminal that is grounded, a resistor $R_{27}$ is connected in series between the pin VIN and the positive electrode of the battery, and meanwhile the pin VIN is connected in series with the capacitor $C_{10}$ and then is grounded.

Figure 8:
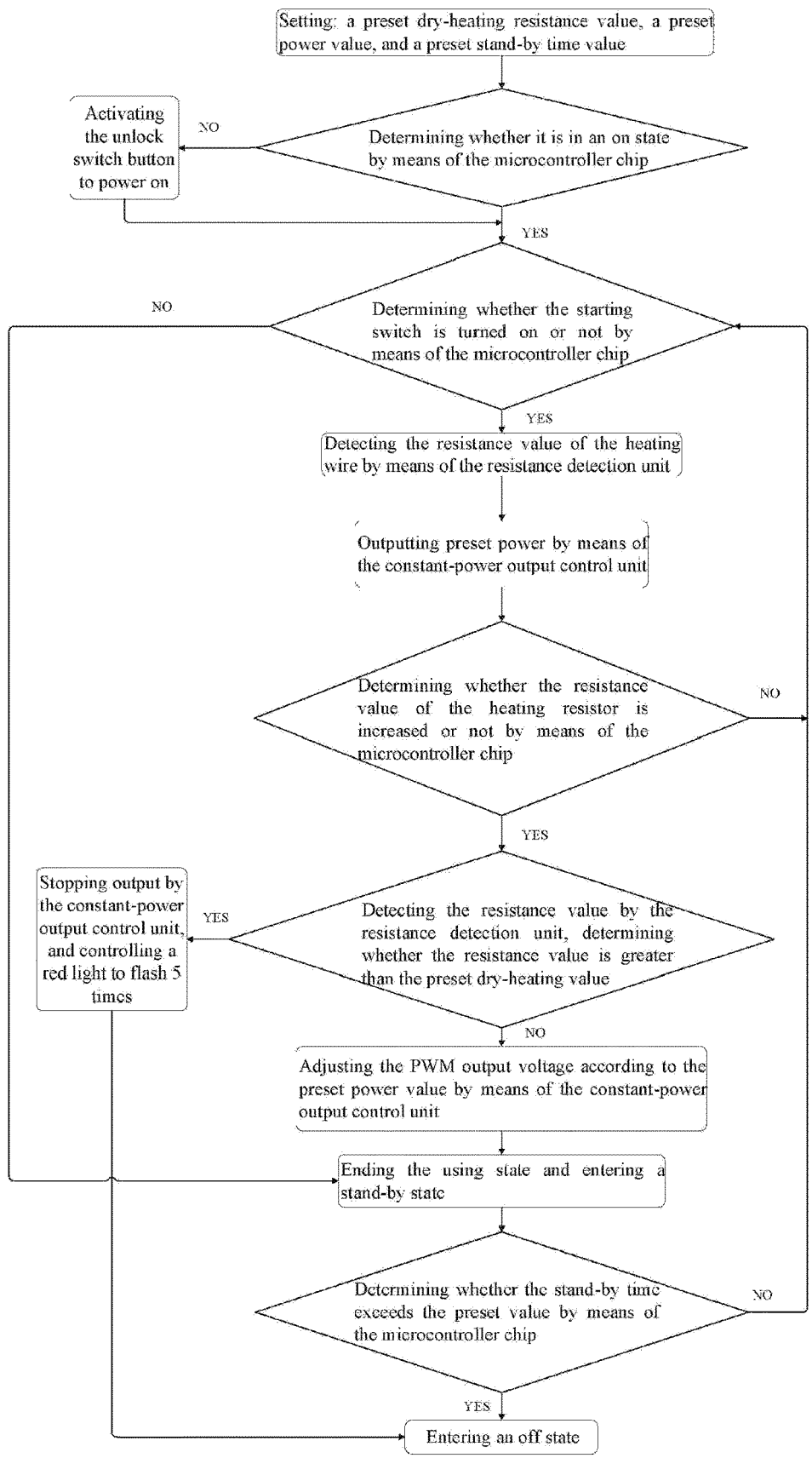
FIG. 8 is a flowchart illustrating a controlling method of the invention.

Referring to FIG. 8, a method of controlling a constant-power electronic cigarette protecting against dry-heating is shown, which comprises steps as follows.

(1) Setting a preset dry-heating resistance value, a preset power value, and a preset stand-by time value;

(2) Determining, by means of the microcontroller chip, whether the electronic cigarette is in an on state or not, if no, go to the next step; if yes, go to the step (4);

(3) Unlocking the unlock switch button to power on;

(4) Determining, by means of the microcontroller chip, whether the starting switch is turned on or not, if yes, go to the next step; if no, go to the step (10);

(5) By means of the resistance detection unit, detecting the resistance value of the heating coil and sending the resistance value signal to the microcontroller chip;

(6) Controlling, by means of the microcontroller chip, the constant-power output control unit to output preset power to the heating resistor;

(7) Determining, by means of the microcontroller chip, whether the resistance value of the heating resistor is increased or not, if yes, go to the next step; if no, go to the step (4);

(8) By means of the resistance detection unit, detecting the resistance value and determining whether the resistance value is greater than the preset dry-heating value or not, if yes, stop output by the constant-power output control unit and control a red light to flash 5 times and go to the step (12); if no, go to the next step;

(9) By means of the constant-power output control unit, adjusting the PWM output voltage according to the preset power value, to maintain constant-power output;

(10) Turning off the starting switch, ending the using state, and entering a stand-by state;

(11) Determining, by means of the microcontroller chip, whether the stand-by time exceeds the preset value or not, if yes, go to the next step; if no, go back to the step (4);

(12) Entering an off state.

INDUSTRIAL APPLICABILITY

All the above are merely preferred embodiments of the present invention, which are not intended to limit the present invention in any form. The present invention is intended to cover all changes, various modifications and equivalent arrangements those skilled in the art can make according to the technical essence of the present invention.

The invention claimed is:

1. A constant-power electronic cigarette protecting against dry-heating, comprising a vaporization rod and a battery rod, wherein a vaporizer is arranged inside the vaporization rod, and the vaporizer comprises a heating resistor for heating and vaporizing electronic cigarette liquid, wherein a battery, a control circuit board, and an unlock switch button are arranged inside the battery rod, wherein a starting switch is arranged inside the vaporization rod or inside the battery rod, the heating resistor is a variable resistor which has a resistance value variable depending on a change in temperature and has a positive temperature coefficient, the control circuit board is arranged with a microcontroller chip, a resistance detection unit, a constant-power output control unit, and an output feedback unit, wherein the unlock switch button and the starting switch are electrically connected with the microcontroller chip, the resistance detection unit is electrically connected with the heating resistor to detect the resistance value of the heating resistor and feed back a resistance value signal to the microcontroller chip, the output feedback unit is electrically connected with the heating resistor to detect the operating voltage of the heating resistor and send a feedback to the microcontroller chip, the constant-power output control unit is electrically connected with the microcontroller chip to receive a PWM control signal from the microcontroller chip, the constant-power output control unit is configured to generate a corresponding PWM voltage value based on the PWM control signal and output it to the heating resistor, to allow the PWM voltage value of the heating resistor to change synchronously with the resistance value of the heating resistor to provide a constant power, in such a manner that an amount of vapor that is generated during heating and vaporization of the electronic cigarette liquid by means of the heating resistor remains the same, and further the resistance value signal is compared with a preset dry-heating value by means of the microcontroller chip, and when the resistance value signal exceeds the preset dry-heating value, an output of the constant-power output control unit is cut off by means of the microcontroller chip to avoid excessively high temperature of the electronic cigarette which can result in dry-heating.

2. The constant-power electronic cigarette protecting against dry-heating according to claim 1, wherein the control circuit board is further arranged with a battery charging unit, a battery protection unit, a battery supply unit, and a battery detection unit, which are electrically connected with the battery, wherein the microcontroller chip is electrically connected with the battery charging unit, the battery protection unit, and the battery detection unit, respectively.

3. The constant-power electronic cigarette protecting against dry-heating according to claim 1, wherein a display unit electrically connected with the microcontroller chip is arranged on an outer surface of the vaporization rod or of the battery rod.

4. The constant-power electronic cigarette protecting against dry-heating according to claim 1, wherein the microcontroller chip includes 20 pins, wherein a first pin is connected with a resistance detection signal output terminal of the resistance detection unit, a third pin is connected with a ground terminal, a fifth pin is connected with a battery supply terminal, an eighth pin is connected with a control signal terminal of the resistance detection unit, a thirteenth pin is connected with a PWM control signal input terminal of the constant-power control unit, a fifteenth pin is electrically connected with an unlock switch button signal terminal, a seventeenth pin is connected with an auxiliary resistance detection signal terminal of the resistance detection unit, a nineteenth pin is connected with a reference voltage terminal, and a twentieth pin is connected with a starting switch signal terminal.

5. The constant-power electronic cigarette protecting against dry-heating according to claim 4, wherein the constant-power output control unit and the resistance detection unit are connected with each other, and the resistance detection unit comprises a first MOSFET having 8 pins, wherein a third pin of the first MOSFET serves as a gate, a fourth pin and a fifth pin are connected with each other and serve as a source, a first pin, a second pin, a sixth pin, a seventh pin, and an eighth pin are connected with each other and serve as a drain, the third pin of the first MOSFET serves as a control signal input terminal, the source of the first MOSFET are connected with the third pin by a resistor R1, wherein the resistance detection unit further comprises resistors $R_5$, $R_3$, $R_{11}$, $R_{24}$ and capacitors $C_1$, $C_2$, the drain of the first MOSFET is connected in series with resistors $R_{11}$, $R_{24}$ and then is grounded, the resistor $R_{24}$ is connected in parallel across the capacitor $C_1$, the resistor $R_{11}$ and the resistor $R_{24}$ are connected with each other at a resistance detection signal output terminal, the drain of the first MOSFET is further connected in series with the resistors $R_5$, $R_3$ and the capacitor $C_2$ and then is grounded, the resistor $R_3$ and the capacitor $C_2$ are connected with each other at an auxiliary resistance detection signal terminal, wherein the constant-power output control unit comprises a second MOSFET having 8 pins, wherein a third pin of the second MOSFET serves as a gate, a fourth pin and a fifth pin are connected with each other and serve as a source, a first pin, a second pin, a sixth pin, a seventh pin, and an eighth pin serve as a drain and are connected with each other to serve as a PWM voltage output terminal, the third pin of the second MOSFET serves as a control signal input terminal of the constant-power control unit, the fourth pin and the fifth pin of the second MOSFET are connected with a positive electrode of the battery, the resistor $R_7$ is connected in series between the third pin and the fourth and fifth pins of the second MOSFET, and further the fourth pin and the fifth pin of the first MOSFET are connected with the fourth pin and the fifth pin of the second MOSFET, and a joint between the resistor $R_5$ and the resistor $R_3$ is connected with the PWM voltage output terminal.

6. The constant-power electronic cigarette protecting against dry-heating according to claim 4, wherein one end of the unlock switch button is grounded, and another end serves as an unlock switch button output signal terminal, and further a resistor $R_{21}$ is connected in series between the signal terminal and a positive electrode of the battery.

7. The constant-power electronic cigarette protecting against dry-heating according to claim 4, wherein the starting switch includes 3 pins, wherein a first pin serves as a starting switch output signal terminal MIC, a second pin serves as a ground terminal, a resistor $R_{27}$ is connected in series between a third pin and a positive electrode of the battery, and further the third pin is connected in series with the capacitor $C_{10}$ and then is grounded.

8. A method of controlling a constant-power electronic cigarette protecting against dry-heating, wherein the method comprises steps of:
   (1) setting a preset dry-heating resistance value, a preset power value, and a preset stand-by time value;
   (2) determining, by means of a microcontroller chip, whether the electronic cigarette is in an on state or not, if no, go to next step; if yes, go to a step (4);
   (3) unlocking an unlock switch button to perform a power on operation;
   (4) determining, by means of the microcontroller chip, whether a starting switch is turned on or not, if yes, go to next step; if no, go to a step (10);
   (5) by means of a resistance detection unit, detecting a resistance value of a heating coil and sending a resistance value signal to the microcontroller chip;
   (6) controlling, by means of the microcontroller chip, a constant-power output control unit to output preset power to a heating resistor;
   (7) determining, by means of the microcontroller chip, whether the resistance value of the heating resistor is increased or not, if yes, go to next step; if no, go to the step (4);
   (8) by means of the resistance detection unit, detecting the resistance value and determining whether the resistance value is greater than the preset dry-heating value or not, if yes, stop output by the constant-power output control unit and control a red light to flash 5 times and go to a step (12); if no, go to next step;
   (9) by means of the constant-power output control unit, adjusting a PWM output voltage according to the preset power value, to maintain constant-power output;
   (10) turning off the starting switch, ending an using state, and entering a stand-by state;
   (11) determining, by means of the microcontroller chip, whether a stand-by time exceeds the preset value or not, if yes, go to next step; if no, go back to the step (4);
   (12) entering an off state.

\* \* \* \* \*